(12) United States Patent
Kitajima et al.

(10) Patent No.: US 8,782,000 B2
(45) Date of Patent: Jul. 15, 2014

(54) MANAGEMENT DEVICE, CORRECTION CANDIDATE OUTPUT METHOD, AND COMPUTER PRODUCT

(75) Inventors: Shinya Kitajima, Kawasaki (JP); Masazumi Matsubara, Kawasaki (JP); Yuji Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 69 days.

(21) Appl. No.: 12/929,683

(22) Filed: Feb. 8, 2011

(65) Prior Publication Data
US 2011/0231700 A1 Sep. 22, 2011

(30) Foreign Application Priority Data

Mar. 19, 2010 (JP) ................................. 2010-064529

(51) Int. Cl.
*G06F 17/30* (2006.01)
(52) U.S. Cl.
USPC ........................................................ 707/609
(58) Field of Classification Search
CPC .......... G06F 17/2007; G06F 111/1435; G06F 15/173
USPC ........................................................ 707/609
See application file for complete search history.

(56) References Cited

U.S. PATENT DOCUMENTS

2003/0033288 A1* 2/2003 Shanahan et al. ................ 707/3
2010/0106821 A1* 4/2010 Akiyama et al. ............ 709/224

FOREIGN PATENT DOCUMENTS

| JP | 10-207889 | 8/1998 |
|---|---|---|
| JP | 2004-038887 | 2/2004 |
| JP | 2005-302043 | 10/2005 |
| JP | 2006-344012 | 12/2006 |
| JP | 2007-304796 | 11/2007 |
| JP | 2008-192110 | 8/2008 |
| JP | 2009-48611 | 3/2009 |
| JP | 2010-55211 | 3/2010 |

OTHER PUBLICATIONS

Japanese Office Action issued Dec. 24, 2013 for corresponding Japanese Application No. 2010-064529.

* cited by examiner

*Primary Examiner* — Rehana Perveen
*Assistant Examiner* — Alexander Khong
(74) *Attorney, Agent, or Firm* — Staas & Halsey LLP

(57) ABSTRACT

A management device includes a storage unit which stores both an attribute value before correction and an attribute value after correction concerning a configuration item as a management target and type information of the configuration item or relationship information between the configuration item and another configuration item; a determination unit which, when an attribute value input for a new configuration item coincides with the attribute value before correction stored in the storage unit, determines a degree of coincidence between type information or relationship information input for the new configuration item and the type information stored in the storage unit or the relationship information stored in the storage unit; and an output unit which outputs the attribute value after correction based on the determination result of the determination unit.

7 Claims, 13 Drawing Sheets

FIG.3
EXAMPLES OF XML
A-XML
```
<A-XML:Switch nickname="sw01" ipaddr="192.168.0.1">
  <A-XML:manufacture country="jp">fujitsu</A-XML:manufacture>
</A-XML:Switch>
```
B-XML
```
<B-XML:sw name="sw01" ip_add="192.168.0.1">
  <B-XML:mfr>fujitsu</B-XML:mfr>
</B-XML:sw>
```
FIG.4
EXAMPLES OF CI/RELATIONSHIP
A-XML
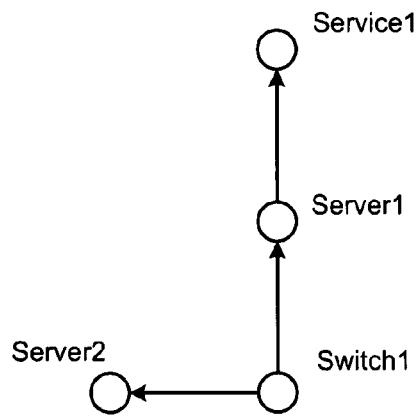
B-XML
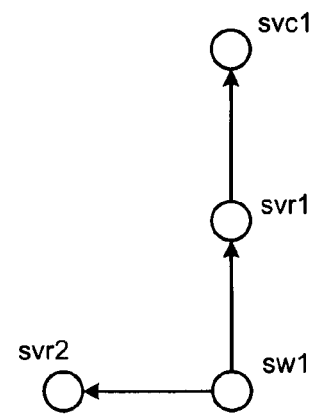

FIG.5

RELATIONSHIP LIST (A-XML)

| src | dst |
|---|---|
| Switch1 | Server1 |
| Switch1 | Server2 |
| Server1 | Service1 |

RELATIONSHIP LIST (B-XML)

| src | dst |
|---|---|
| sw1 | svr1 |
| sw1 | svr2 |
| svr1 | svc1 |

FIG.6

Switch1 [CI TYPE: Switch] (A-XML)

| ATTRIBUTE NAME | ATTRIBUTE VALUE |
|---|---|
| Switch/@nickname | sw01 |
| Switch/@ipaddr | 192.168.0.1 |
| Switch/manufacture | fujitsu |
| Switch/manufacture/@country | jp | sw1 [CI TYPE: Switch] (B-XML)

| ATTRIBUTE NAME | ATTRIBUTE VALUE |
|---|---|
| sw/@name | sw01 |
| sw/@ip_add | 192.168.0.1 |
| sw/mfr | fujitsu |

Server1 [CI TYPE: Server] (A-XML)

| ATTRIBUTE NAME | ATTRIBUTE VALUE |
|---|---|
| Server/@nickname | svr01 |
| Server/@ipaddr | 192.168.0.2 |
| Server/os | Server 2008 | svr1 [CI TYPE: Server] (B-XML)

| ATTRIBUTE NAME | ATTRIBUTE VALUE |
|---|---|
| svr/@name | svr01 |
| svr/@ip_add | 192.168.0.2 |
| svr/os | Windows Server 2008 |

FIG.7

HISTORY TABLE

| BEFORE CORRECTION | AFTER CORRECTION | src | CI TYPE | In NUMBER | Out NUMBER | PRIORITY |
|---|---|---|---|---|---|---|
| WinXP Pro | Windows XP Professional | Server5 | Server | 1 | 1 | 2.0 |
| RHEL 5.0 | Red Hat Enterprise Linux 5.0 | Server6 | Server | 1 | 2 | 1.0 |
| Server 2008 | Windows Server 2008 | Switch1 | Server | 1 | 1 | 2.0 |

FIG.10

ADDITIONAL CI
svr3 [CI TYPE: Server] (B-XML)

| ATTRIBUTE NAME | ATTRIBUTE VALUE |
|---|---|
| svr/@name | svr03 |
| svr/@ip_add | 192.168.0.4 |
| svr/os | Server 2008 |

FIG.11

ADDITIONAL RELATIONSHIP (B-XML)

| src | dst |
|---|---|
| sw1 | svr3 |

US 8,782,000 B2

MANAGEMENT DEVICE, CORRECTION CANDIDATE OUTPUT METHOD, AND COMPUTER PRODUCT

CROSS-REFERENCE TO RELATED APPLICATION

This application is based upon and claims the benefit of priority of the prior Japanese Patent Application No. 2010-064529, filed on Mar. 19, 2010, the entire contents of which are incorporated herein by reference.

FIELD

The embodiments discussed herein are directed to a management device, a correction candidate output method, and a computer product.

BACKGROUND

In recent years, cloud computing is known in which an external data center or the like collectively manages hardware, software, data, and the like. For example, software-as-a-service (SaaS), platform-as-a-service (PaaS), infrastructure-as-a-service (IaaS), or the like corresponds to cloud computing.

As a method in which the data center or the like manages data regarding different types of business, a company which provides a service to a user by using the above-described cloud computing is introducing a federated configuration management database (FCMDB). The FCMDB is a technique which virtually integrates a plurality of different types of DBs by using a CMDB from an information technology infrastructure library (ITIL) and enables seamless collaboration of a plurality of systems.

For example, as illustrated in FIG. 17, the FCMDB virtually integrates and manages configuration item information representing configuration items (CI) stored in a configuration information management system in which data is managed in an A-XML format and a service management system in which data is managed in a B-XML format. Then, when different DBs retain the same type of information, the FCMDB generates and retains association between configuration items so as to ensure synchronism and coherence of configuration item information.

On the other hand, when there is an orthographic variant between a plurality of different types of DBs, disintegration of search results or erroneous update of update processing may occur. For example, as illustrated in FIG. 18, in the case of A-XML of the configuration information management system, the attribute value of an attribute name "OS" is written as "Windows (Registered Trademark) XP Professional." Meanwhile, in the case of B-XML of the service management system, the attribute value of the attribute name "OS" is written as "WinXP Pro." Here, "Windows XP Professional" and "WinXP Pro" are the same content but different writings. Thus, there is an orthographic variant between A-XML data in the configuration information management system and B-XML data in the service management system.

As a method of correcting an orthographic variant, it is considered that an orthographic variant is corrected by using a technique for checking consistency on the basis of the data form. Specifically, the data forms (for example, Chinese numerals, alphanumeric characters, and the like) are learned in advance and, when data is input, consistency is checked on the basis of the data forms. As the result of this check, when the data forms are different, sites to be corrected in data are detected, and correction candidates are presented to the user such that the user corrects an orthographic variant.

Japanese Laid-open Patent Publication No. 2006-344012 is an example of the related art.

However, according to the above-described technique for checking consistency on the basis of the data forms, there is a problem in that it is impossible to detect an orthographic variant, such as abbreviation of characters or erroneous omission, and to appropriately present correction candidates. That is, according to the technique for checking consistency on the basis of the data forms and presenting correction candidates to the user, while it is possible to present correction candidates for inconsistency between the formats (for example, Chinese numerals, alphanumeric characters, and the like) of numerals included in data, it is impossible to detect an orthographic variant, such as abbreviation of characters or erroneous omission. As a result, there is a problem in that it is impossible to appropriately present correction candidates.

SUMMARY

According to an aspect of an embodiment of the invention, a management device includes a storage unit which stores both an attribute value before correction and an attribute value after correction concerning a configuration item as a management target and type information of the configuration item or relationship information between the configuration item and another configuration item; a determination unit which, when an attribute value input for a new configuration item coincides with the attribute value before correction stored in the storage unit, determines a degree of coincidence between type information or relationship information input for the new configuration item and the type information stored in the storage unit or the relationship information stored in the storage unit; and an output unit which outputs the attribute value after correction based on the determination result of the determination unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating examples of XML data which is stored in databases which are virtually integrated;

FIG. 4 is a diagram illustrating relationships between configuration items;

FIG. 5 is a diagram illustrating examples of a relationship list;

FIG. 6 is a diagram illustrating examples of attribute values of A-XML and B-XML configuration items;

FIG. 7 is a diagram illustrating an example of a history table;

FIG. 10 is a diagram illustrating an example of attribute values of additional configuration items;

FIG. 11 is a diagram illustrating an example of a relationship of additional configuration items;

DESCRIPTION OF EMBODIMENTS

Preferred embodiments of the present invention will be explained with reference to accompanying drawings. The embodiments are not intended to limit the invention.

[a] First Embodiment

Figure 1:
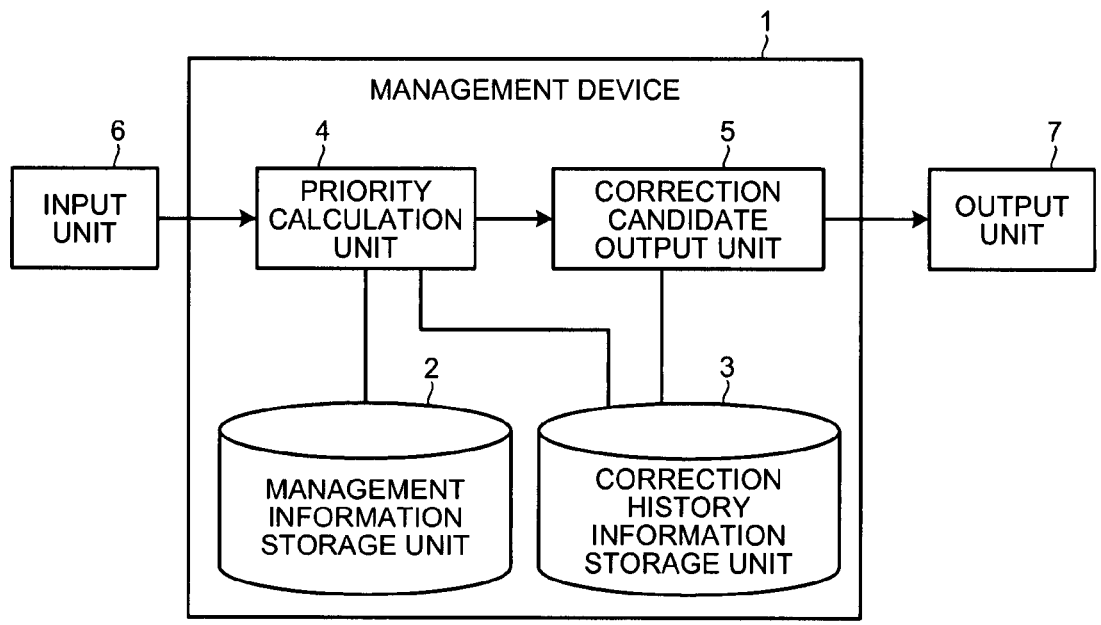
FIG. 1 is a block diagram illustrating the configuration of a management device according to a first embodiment.

First, a management device disclosed herein will be described with reference to FIG. 1. FIG. 1 is a block diagram illustrating a management device according to a first embodiment.

As illustrated in FIG. 1, a management device 1 is a device which virtually integrates a plurality of DBs, and includes a management information storage unit 2, a correction history information storage unit 3, a priority calculation unit 4, a correction candidate output unit 5, an input unit 6, and an output unit 7.

The management information storage unit 2 stores configuration item information representing configuration items as a management target and relationship information representing a relationship between the configuration items as a management target. The correction history information storage unit 3 stores correction information of attribute values (including an attribute value (A) before correction and an attribute value (B) after correction) included in the configuration item information. The correction history information storage unit 3 further stores type information of a configuration item with a corrected attribute value or relationship information between a configuration item with a corrected attribute value and another configuration item. The correction history information storage unit 3 may store all kinds of correction information, type information, and relationship information.

If the attribute value (or configuration item information including the attribute value) concerning a new configuration item is input from the input unit 6, the priority calculation unit 4 determines whether or not a newly input attribute value coincides with the attribute value (A) before correction stored in the correction history information storage unit 3. When the input attribute value coincides with the attribute value (A) before correction stored in the correction history information storage unit 3, the priority calculation unit 4 compares the type information of the configuration item corresponding to the attribute value (A) before correction or the relationship information of the configuration item corresponding to the attribute value (A) before correction with the type information or relationship information (type information and relationship information are also input from the input unit 6 concerning the newly input configuration item, and determines the degree of coincidence. That is, the degree of confidence (priority) is calculated which represents how much the input attribute value is likely to be corrected to the attribute value (B) which is the attribute value after the attribute value (A) before correction is corrected. In comparison, the type information of the configuration item corresponding to the attribute value (A) before correction and the relationship information of the configuration item corresponding to the attribute value (A) before correction may be compared with type information and relationship information of the newly input configuration item.

The correction candidate output unit 5 outputs correction information stored in the correction history information storage unit 3 as a correction candidate to the output unit 7 on the basis of the priority calculated by the priority calculation unit 4. For example, the correction candidate output unit 5 outputs the attribute value (B) after correction. The correction candidate output unit 5 outputs an attribute value after correction whose priority (the likelihood as a correction candidate) exceeds a predetermined reference and does not output an attribute value after correction whose priority (the likelihood as a correction candidate) does not exceed the predetermined reference, whereby outputting and presenting only a more likely correction candidate. The correction candidate output unit 5 may output both the attribute value after correction and the corresponding priority may be output.

That is, by detecting that the attribute value of newly added configuration item information coincides with the attribute value before correction included in the correction history, an orthographic variant, such as abbreviation of characters or erroneous omission can be detected. The priority is calculated using the past correction history and a correction candidate is output to the user in accordance with the priority, appropriately presenting a correction candidate. When there is a plurality of correction candidates, if an operation is done to select one correction candidate, the attribute value may be changed by the selected correction candidate. After information input from the input unit 6 is temporarily stored in the management information storage unit 2, the above-described determination or the like (the priority calculation) may be done.

As described above, when the attribute value of the newly added CI coincides with the attribute value in the correction history, the management device 1 calculates the priority of the correction candidate on the basis of the CI and relationship data and presents a correction candidate in accordance with the priority, appropriately presenting a correction candidate.

[b] Second Embodiment

In a second embodiment described below, the configuration of an FCMDB and the flow of processing in the FCMDB according to the second embodiment will be described sequentially, and finally the effects of the second embodiment will be described.

Configuration of FCMDB

Figure 2:
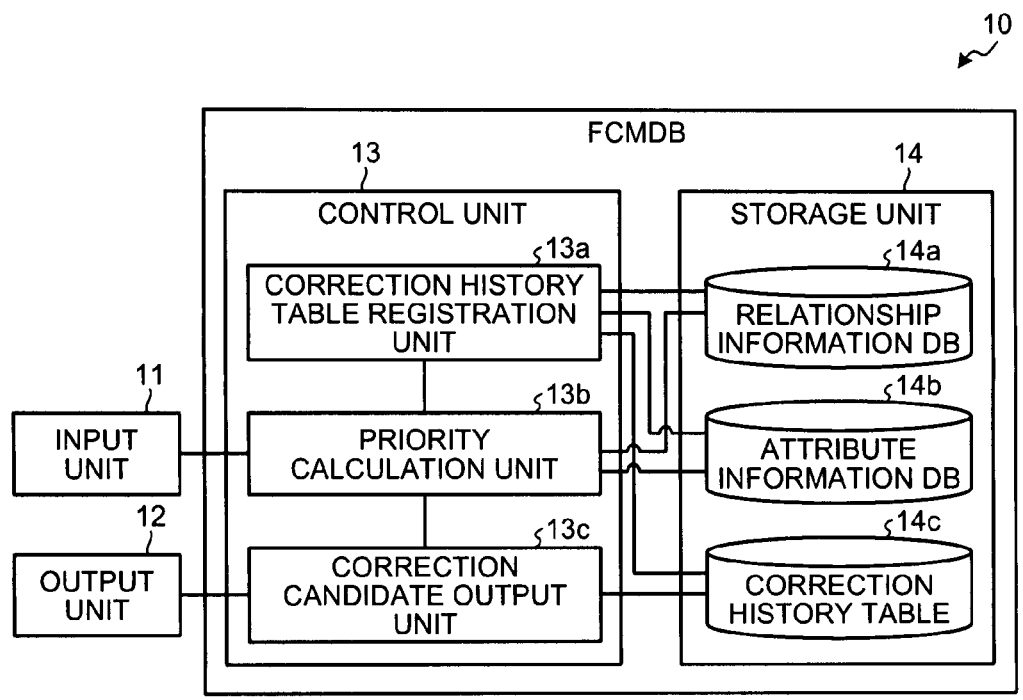
FIG. 2 is a block diagram illustrating the configuration of an FCMDB according to a first embodiment.

Next, the configuration of the FCMDB will be described with reference to FIG. 2. FIG. 2 is a block diagram illustrating the configuration of the FCMDB according to the second embodiment. As illustrated in FIG. 2, an FCMDB 10 has a control unit 13 and a storage unit 14, and is connected to an input unit 11 and an output unit 12. Hereinafter, processing in the respective units will be described.

The input unit 11 is, for example, a keyboard, a mouse, a microphone, or the like, and inputs a CI to be newly added or the like. The output unit 12 is, for example, a monitor, a display, a touch panel, a speaker, or the like, and outputs a correction candidate.

The storage unit 14 has a relationship information DB 14a, an attribute information DB 14b, and a correction history table 14c. The relationship information DB 14a stores CI which are configuration items in an information system and relationship which represents relationships between configuration items stored in databases which are virtually integrated.

For example, the relationship information DB 14a stores A-XML data and B-XML data, as illustrated in FIG. 3, and stores relationships between A-XML and B-XML CIs, as illustrated in FIG. 4. FIG. 3 is a diagram illustrating an example of XML data which is stored in databases which are virtually integrated. FIG. 4 is a diagram illustrating a relationship between CIs. FIG. 5 is a diagram illustrating an example of a relationship list.

In the example of FIG. 3, with regard to "Switch" which is an A-XML CI as XML data, the attribute value of an attribute name "nickname" is "sw01" and the attribute value of an attribute name "ipaddr" is "192.168.0.1." With regard to "Switch" which is an A-XML CI, the attribute value of an attribute name "manufacture" is "fujitsu" and the attribute value of an attribute name "manufacture country" is "jp." In the example of FIG. 3, with regard to "sw" which is a B-XML CI as XML data, the attribute value of an attribute name "name" is "sw01," the attribute value of an attribute name "ip_add" is "192.168.0.1," and the attribute value of an attribute name "mfr" is "fujitsu."

In FIG. 4, the relationship between "Switch1," "Server1," "Service1," and "Server2" which are A-XML CIs is stored. The relationship between "sw1," "svr1," "svc1," and "svr2" which are B-XML CIs is stored. FIG. 4 illustrates that "Switch1," "Server1," "Service1," and "Server2" which are A-XML CIs are respectively the same as "sw1," "svr1," "svc1," and "svr2" which are B-XML CIs.

As illustrated in FIG. 5, the relationship information DB 14a stores a relationship list. The relationship information DB 14a stores, as the relationship, "src" representing a CI as a connection source and "dst" representing a CI as a connection destination in association with each other. In the example of FIG. 5, the relationship information DB 14a stores, as the A-XML relationship, a relationship in which "src" is "switch1" and "dst" is "Server1," a relationship in which "src" is "switch1" and "dst" is "Server2," and a relationship in which "src" is "Server1" and "dst" is "Service1."

In the example of FIG. 5, the relationship information DB 14a stores, as the B-XML relationship, a relationship in which "src" is "sw1" and "dst" is "Svr1," a relationship in which "src" is "sw1" and "dst" is "svr2," and a relationship in which "src" is "Svr1" and "dst" is "Svc1."

The attribute information DB 14b stores attribute values representing the attributes of the respective CIs. Specifically, with regard to the attribute values of the respective A-XML and B-XML CIs, the attribute information DB 14b stores information illustrated in FIG. 6. FIG. 6 is a diagram illustrating examples of the attribute values of the A-XML and B-XML CIs.

For example, as illustrated in FIG. 6, the attribute information DB 14b stores "Switch/@nickname, sw01" and "Switch/@ipaddr, 192.168.0.1" as "attribute name, attribute value" of "Switch1" which is the A-XML CI. The attribute information DB 14b also stores "Switch/manufacture, fujitsu" and "Switch/manufacture/@country, jp" as "attribute name, attribute value" of "Switch1" which is the A-XML CI.

Similarly, as illustrated in FIG. 6, the attribute information DB 14b stores "Server/@nickname, svr01" and "Server/@ipaddr, 192.168.0.2" as "attribute name, attribute value" of "Server1" which is the A-XML CI. The attribute information DB 14b also stores "Server/os, Server 2008" as "attribute name, attribute value" of "Server1" which is the A-XML CI.

As illustrated in FIG. 6, the attribute information DB 14b also stores "sw/@name, sw01," "sw/@ip_add, 192.168.0.1," and "sw/mfr, fujitsu" as "attribute name, attribute value" of "sw1" which is the B-XML CI. Similarly, as illustrated in FIG. 6, the attribute information DB 14b stores "svr/@name, svr01," "svr/@ip_add, 192.168.0.2," and "svr/os, Windows Server 2008" as "attribute name, attribute value" of "svr1" which is the B-XML CI.

"nickname" or "name" of the attribute name stored in the attribute information DB represents a server name or a host name, and "ipaddr" or "ip_addr" represents the IP (Internet Protocol) address of a server or the like. "manufacture" or "mfr" represents the manufacturer of a server or the like, or a service provider. "manufacture/country" represents a country to which a manufacture or a service provider belongs, and "os" represents an OS (operating system) to be used.

Returning to the description of FIG. 2, the correction history table 14c stores, as correction history information, correction information of the attribute values in the CIs, information of CIs with a corrected attribute value, and the relationships between the CIs with a corrected attribute value. Specifically, as illustrated in FIG. 7, the correction history table 14c stores "before correction" which is an attribute value before correction, "after correction" which is an attribute value after correction, "src" which represents the CI as the connection source, and "CI type" which represents the type of a CI. The correction history table 14c also stores "In number" which is the number of connections with another CIs as the connection source, "Out number" which is the number of connections with another CIs as the connection destination, and "priority" which is the priority of a correction candidate to be presented to the user.

The control unit 13 has an internal memory which stores programs defining various processing procedures and necessary data, and performs various kinds of processing on the basis of the programs and necessary data. The control unit 13 has a correction history table registration unit 13a, a priority calculation unit 13b, and a correction candidate output unit 13c.

The correction history table registration unit 13a registers, as correction history information, correction information of the attribute values included in the CIs, information of CIs with a corrected attribute value, and the relationships between corrected CIs in the correction history table 14c. Specifically, the correction history table registration unit 13a compares the attribute values between coincident CIs within the respective CMDBs at the time of schema integration, and determines whether or not there are different attribute values.

When there are different attribute values between the coincident CIs, the correction history table registration unit 13a determines whether or not these attribute values are actually the same attribute value. As the method of determining whether or not the attribute values are actually the same attribute value, an administrator may confirm whether or not the attribute values are the same attribute value, or dictionary data may be prepared to determine whether or not the attribute values are the same attribute value.

As a result, when it is determined that the attribute values are actually the same attribute value, it is determined whether or not the set of attribute values has not yet been registered in the correction history table 14c. As a result, when the set of attribute values has already been registered, the correction history table registration unit 13a raises the priority of the relevant history. When the set of attribute values has not yet been registered in the correction history table 14c, the correction history table registration unit 13*a* acquires the In/Out numbers of the relationship of both CIs, the CI types, and src.

Thereafter, the correction history table registration unit 13*a* determines whether or not the In/Out numbers of the relationships of both CIs coincide with each other and, when the In/Out numbers of the relationship of both CIs do not coincide with each other, registers correction information before and after correction, the In/Out numbers, the CI type, src, and a default priority in the correction history table 14*c*. When the In/Out numbers of the relationship of both CIs do not coincide with each other, the correction history table registration unit 13*a* raises the priority of the history and registers correction information before and after correction, the In/Out numbers, the CI type, src, and a default priority in the correction history table 14*c*.

Figure 8:
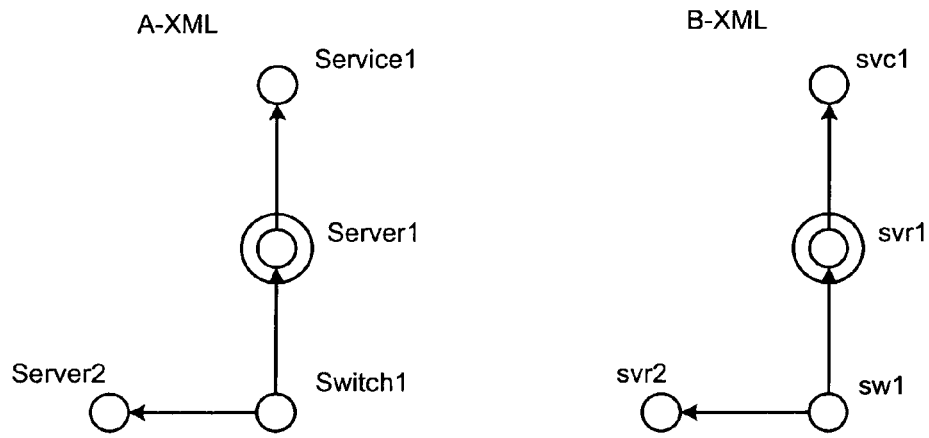
FIG. 8 is a diagram illustrating history table registration processing.
Figure 9:
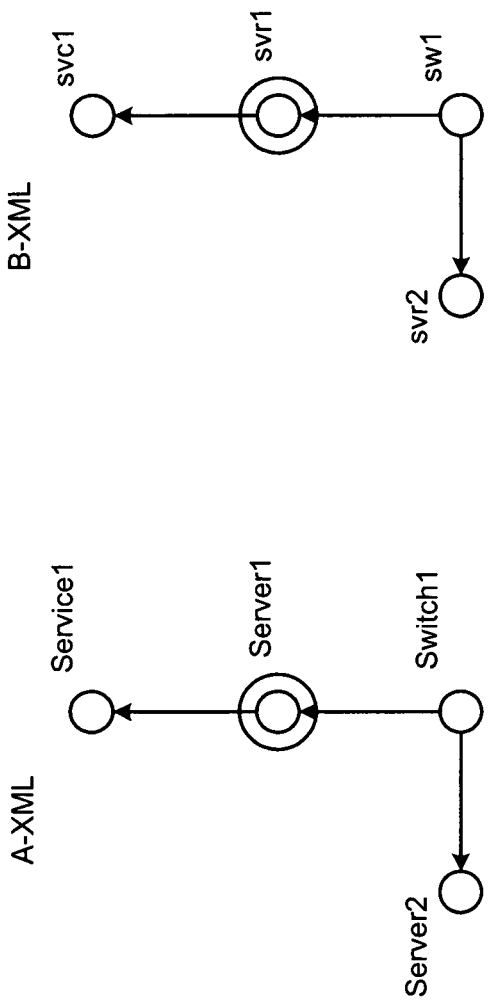
FIG. 9 is a diagram illustrating history table registration processing.

History table registration processing will be specifically described in connection with examples of FIGS. 8 and 9. FIGS. 8 and 9 are diagrams illustrating history table registration processing. In the example of FIG. 8, a case will be described where Server1 of A-XML and svr1 of B-XML are the same CI and Server1 of A-XML and svr1 of B-XML are compared with each other.

As illustrated in FIG. 8, the correction history table registration unit 13*a* compares the attribute values of Server1 of A-XML and svr1 of B-XML at the time of schema integration and determines whether or not there are different attribute values. In the example of FIG. 8, since the attribute value "Server 2008" of Server1 of A-XML and the attribute value "Windows Server 2008" of svr1 of B-XML are different from each other, the correction history table registration unit 13*a* determines that there are different attribute values. Then, the correction history table registration unit 13*a* unifies the attribute values to one attribute value on the integrated schema.

In the example of FIG. 9, the correction history table registration unit 13*a* unifies the attribute values to "Windows Server 2008." Then, as illustrated in FIG. 9, the correction history table registration unit 13*a* references the correction history table 14*c* and determines whether or not a set of attribute values before and after correction is registered. As a result, when the set of attribute values has already been registered, the correction history table registration unit 13*a* raises the priority of the relevant history.

When the set of attribute values has not yet been registered in the correction history table 14*c*, the correction history table registration unit 13*a* acquires the In/Out numbers of the relationship of both CIs, the CI types, and src. In the example of FIG. 9, the correction history table registration unit 13*a* acquires the In number "1" and the Out number "1" of the relationship of Server1 of A-XML, the CI type "Server," and src "Switch1." The correction history table registration unit 13*a* also acquires the In number "1" and the Out number "1" of the relationship of Svr1 of B-XML, the CI type "Server," and src "Sw1."

Thereafter, the correction history table registration unit 13*a* determines whether or not the In/Out numbers of the relationship of both CIs coincide with each other. In the example of FIG. 9, the correction history table registration unit 13*a* determines that the In number "1" and the Out number "1" of the relationship of Server1 of A-XML coincide with the In number "1" and the Out number "1" of the relationship of Svr1 of B-XML.

When the In/Out numbers of the relationship of both CIs coincide with each other, the correction history table registration unit 13*a* raises the priority of the history to "2.0" which is two times greater than the default "1.0." The correction history table registration unit 13*a* registers correction information before and after correction, the In/Out numbers, the CI type, src, and the default priority in the correction history table 14*c*. In the example of FIG. 9, the correction history table registration unit 13*a* registers correction information before correction "Server 2008," correction information after correction "Windows Server 2008," src "Switch," the CI type "Server," the In number "1," the Out number "1," and the priority "2.0" in the correction history table 14*c*.

When the In/Out numbers of the relationship of both CIs do not coincide with each other, the correction history table registration unit 13*a* does not raise the priority and registers the priority of the history as the default "1.0." In order to improve precision, determination may be done whether or not the In/Out numbers coincide with each other over several hops.

As the example of registration of the priority, when both the In numbers and the Out numbers are the same, the correction history table registration unit 13*a* registers a value X times (in the above-described, twice) greater than the default "1.0" as the priority. When only the In numbers are the same, the correction history table registration unit 13*a* registers a value Y times greater than the default "1.0" as the priority and, when only the Out numbers are the same, registers a value Z times greater than the default "1.0" as the priority. It is assumed that Y and Z are values smaller than X.

When a CI is newly added, the priority calculation unit 13*b* determines whether or not the attribute value included in the added CI coincides with correction information stored in the correction history table 14*c*. When it is determined that the attribute value coincides with the correction information, the priority calculation unit 13*b* compares the CI and relationship information of the correction information with the CI and relationship information of the added configuration item, and calculates the priority of the correction information.

Specifically, if the registration of a new CI by the user is received, the priority calculation unit 13*b* acquires the In/Out numbers of the relationship of the registered new CI, src, and the CI type. For example, as illustrated in FIG. 10, as an additional CI of B-XML, "svr/@name, svr03," "svr/@ip_add, 192.168.0.4," and "svr/os, Server 2008" are stored in the attribute information DB 14*b* as "attribute name, attribute value" of "svr3." As illustrated in FIG. 11, as an additional relationship of B-XML, a relationship in which "src" is "sw1" and "dst" is "Svr3" is stored in the relationship information DB 14*a*.

The priority calculation unit 13*b* determines whether or not there is a history in which the attribute value of the new CI coincides with the attribute value before correction within the correction history table 14*c* and, when there is a history with a coincident attribute value within the correction history table 14*c*, the priority of the history is calculated. As the method of calculating the priority of the history, the priority calculation unit 13*b* compares whether or not the In/Out numbers, src, and the CI type of the history, in which the attribute value coincides with the attribute value of the new CI, are respectively the same as the In/Out numbers, src, and the CI type of the new CI, and calculates such that the priority increases as the In/Out numbers, src, and the CI type are the same.

Figure 12:
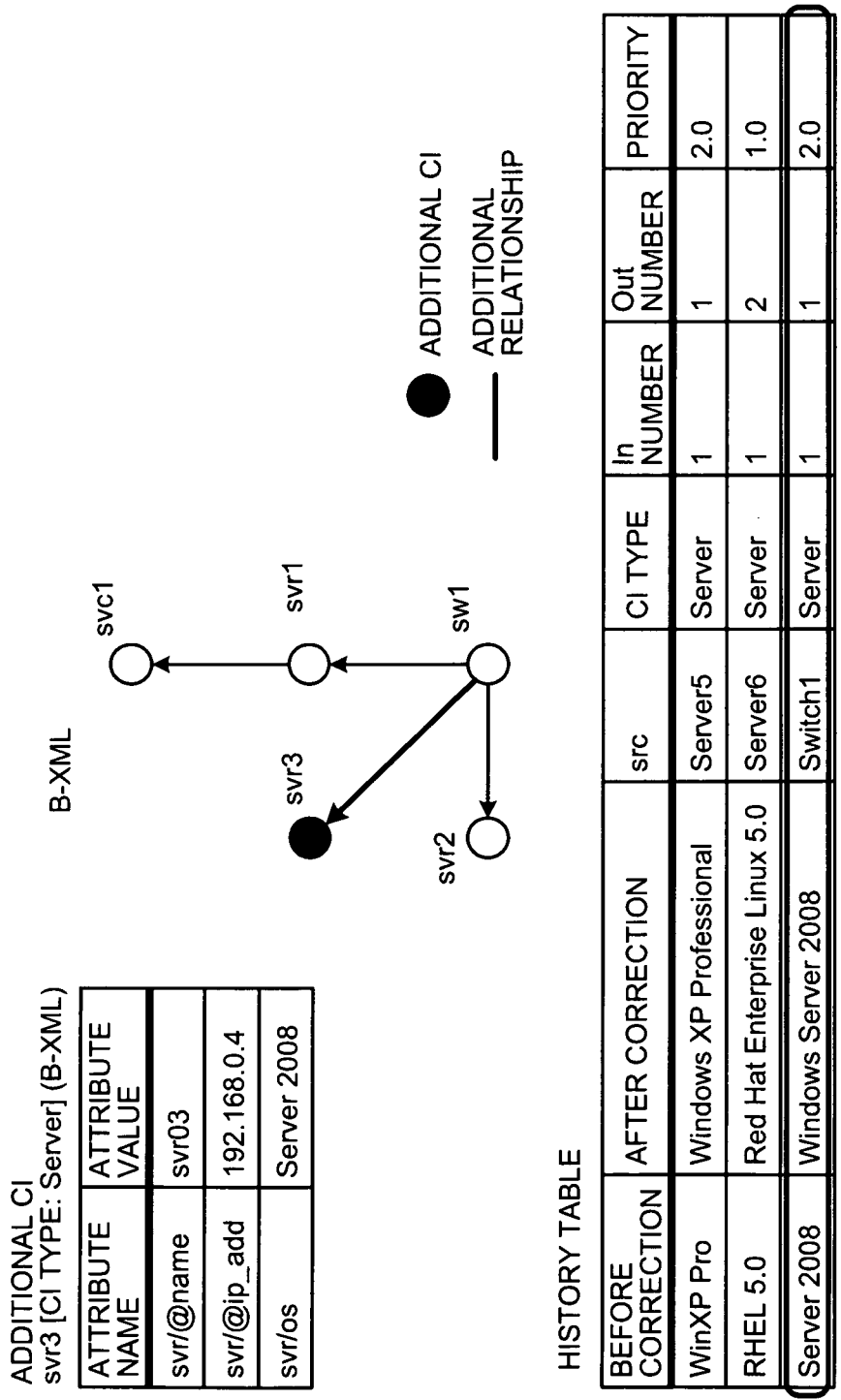
FIG. 12 is a diagram illustrating priority calculation processing.

Priority calculation processing will be described in connection with an example of FIG. 12. In the example of FIG. 12, a case will be described where "svr3" which is a CI of B-XML is added. As "attribute name, attribute value" of "svr3," "svr/@name, svr03," "svr/@ipaddr, 192.168.0.4," and "svr/os, Server 2008" are stored in the attribute information DB 14*b*.

The priority calculation unit 13*b* acquires src "Switch1," the CI type "Server," the In number "1," and the Out number "1" as src, the CI type, and the In/Out numbers of "svr3." The priority calculation unit 13b determines whether or not the attribute values of the "svr3" coincide with the attribute values before correction of the correction information stored in the correction history table 14c.

In the example of FIG. 12, with regard to "svr3" which is the new CI, the priority calculation unit 13b determines whether or not the attribute value "Server 2008" of the attribute name "svr/os" coincides with the attribute value "Server 2008" before correction in the correction history table.

As a result, as the method of calculating the priority of the history, the priority calculation unit 13b compares whether or not the In/Out numbers, src, and the CI type of the history, in which the attribute value coincides with the attribute value of the new CI, are respectively the same as the In/Out number, src, and the CI type of the new CI, and calculates such that the priority increases as the In/Out numbers, src, and the CI type are the same.

For example, as the example of calculation of the priority, when all of the In/Out numbers, src, and the CI type coincide, the priority calculation unit 13b calculates a value, which is obtained by multiplying the priority of the correction history table 14c by P, as the priority. When src and the CI type are coincident, a value which is obtained by multiplying the priority of the correction history table 14c by Q smaller than P is calculated as the priority. The priority is set to increase when src, the CI type, the In number, and the Out number are coincident in that order.

In the example of FIG. 12, since all of src "Switch1," the CI type "Server," the In number "1," and the Out number "1" are the same, a value which is obtained by multiplying the priority "2.0" of the correction history table 14c by P, is calculated as the priority. With regard to the calculated priority, the priority for the additional CI is only calculated, such that the priority in the correction history table 14c is not updated.

The correction candidate output unit 13c outputs the correction information stored in the correction history table 14c as a correction candidate in accordance with the priority. Specifically, the correction candidate output unit 13c sequentially presents the attribute values after correction as a correction candidate in a descending order of priority. Only when the calculated priority is equal to or greater than a predetermined threshold value, the correction candidate output unit 13c may output the correction information stored in the correction history table 14c as a correction candidate. That is, the correction information having low priority may be excluded from correction candidates, narrowing down correction candidates to be presented.

The correction candidate output unit 13c determines whether or not the user carries out correction in accordance with a correction candidate, when the user corrects in accordance with a correction candidate, raises the priority of the relevant history, and when the user does not carry out correction in accordance with a correction candidate, lowers the priority of the relevant history.

Figure 13:
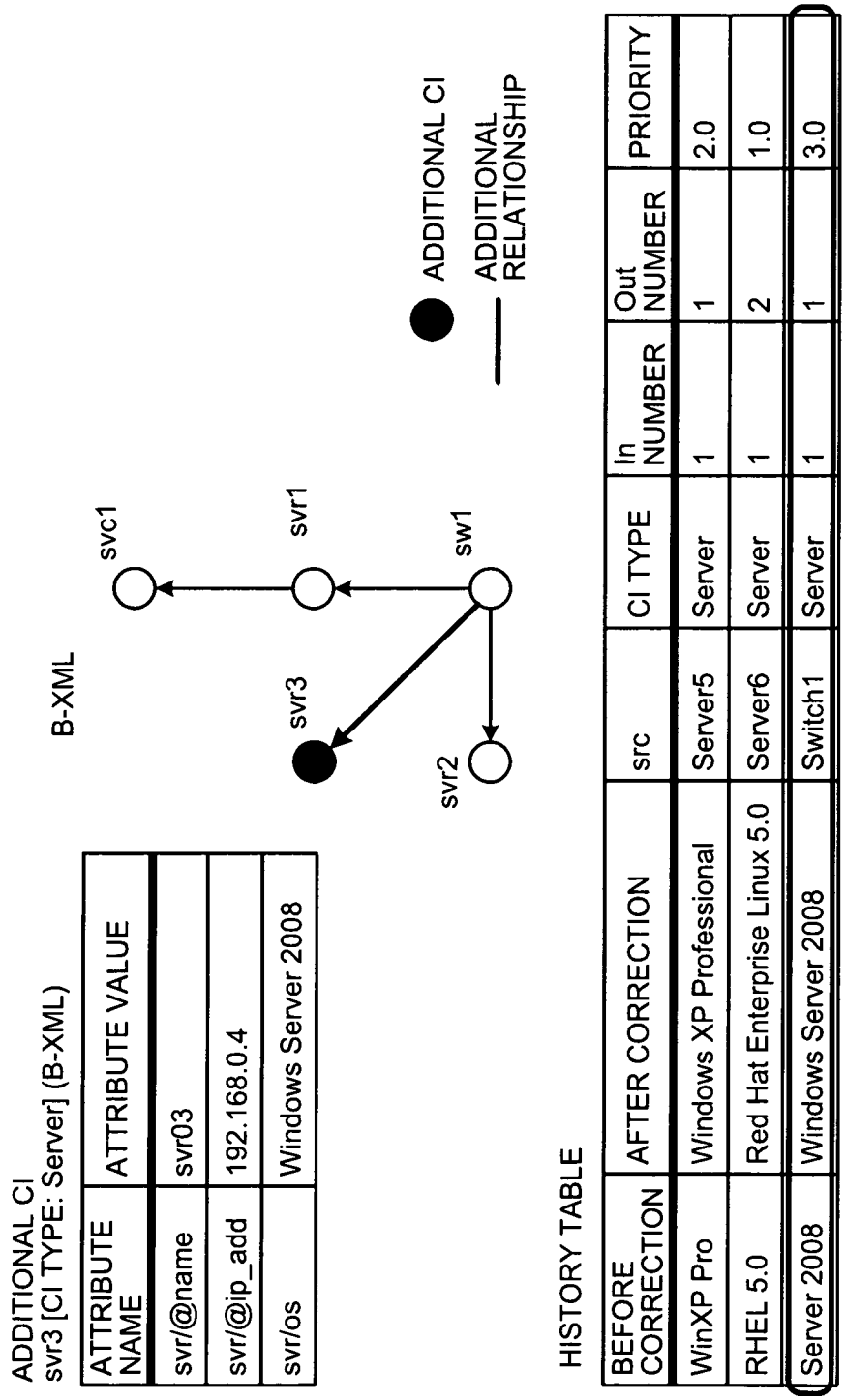
FIG. 13 is a diagram illustrating correction candidate presentation processing.

For example, in the example of FIG. 13, the correction candidate output unit 13c presents "Windows Server 2008" as a correction candidate and, when the user carries out correction in accordance with the correction candidate, changes the priority from "2.0" to "3.0."

Processing by FCMDB

Figure 14:
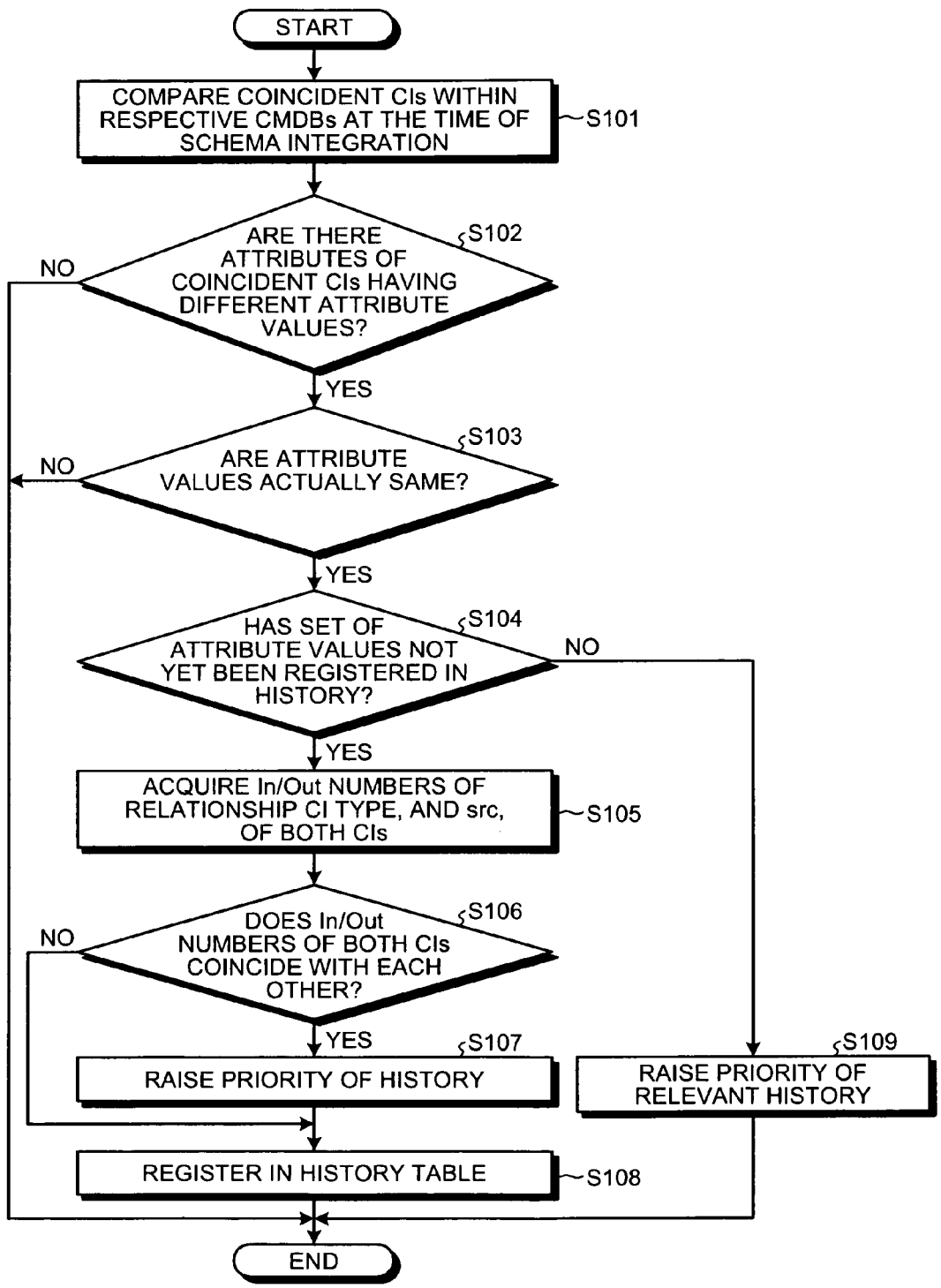
FIG. 14 is a flowchart illustrating the operation of history table registration processing of an FCMDB according to a second embodiment.
Figure 15:
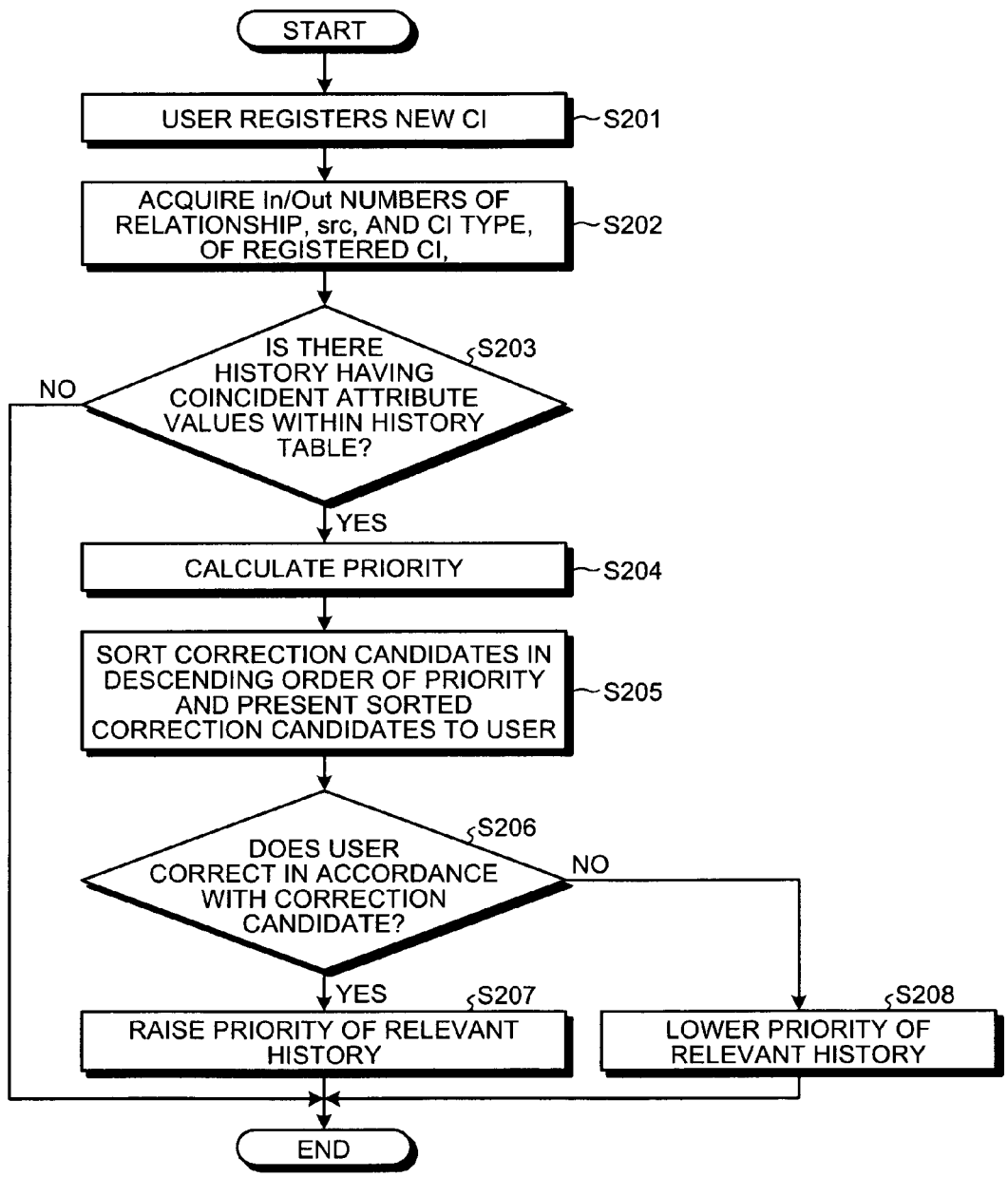
FIG. 15 is a flowchart illustrating the operation of correction candidate presentation processing of an FCMDB according to a second embodiment.

Next, processing by the FCMDB according to the second embodiment will be described with reference to FIGS. 14 and 15. FIG. 14 is a flowchart illustrating the operation of history table registration processing of the FCMDB according to the second embodiment. FIG. 15 is a flowchart illustrating the operation of correction candidate presentation processing of the FCMDB according to the second embodiment.

As illustrated in FIG. 14, the FCMDB 10 compares coincident CIs within the respective CMDBs at the time of schema integration (Step S101). As a result, when there are no attributes between the coincident CIs with different attribute values (No in Step S102), the FCMDB 10 ends the history table registration processing. When there are attributes between the coincident CIs with different attribute values (Yes in Step S102), the FCMDB 10 determines whether or not the attribute values are actually the same attribute value (Step S103). As the method of determining whether or not the attribute values are actually the same attribute value, the administrator may confirm whether or not the attribute values are the same attribute value, or dictionary data may be prepared to determine whether or not the attribute values are the same attribute value.

As a result, when it is determined that the attribute values are not actually the same attribute value (No in Step S103), the FCMDB 10 ends the history table registration processing. When it is determined that the attribute values are actually the same attribute value (Yes in Step S103), the FCMDB 10 determines whether or not the set of attribute values has not yet been registered in the history (Step S104).

As a result, when the set of attribute values has already been registered in the history (No in Step S104), the FCMDB 10 raises the priority of the relevant history (Step S109) and ends the history table registration processing. When the set of attribute values has not yet been registered in the history (Yes in Step S104), the FCMDB 10 acquires the In/Out numbers of the relationship of both CIs, the CI types, and src (Step S105).

Thereafter, the FCMDB 10 determines whether or not the In/Out numbers of the relationship of both CIs coincide with each other (Step S106), when the In/Out numbers of the relationship of both CIs do not coincide with each other (No in Step S106), registers the correction information before and after correction, the In/Out numbers, the CI type, src, and the default priority in the correction history table 14c (Step S108), and ends the history table registration processing. When the In/Out numbers of the relationship of both CIs coincide with each other (Yes in Step S106), the FCMDB 10 raises the priority of the history (Step S107), registers the correction information before and after correction, the In/Out numbers, the CI type, src, and the default priority in the correction history table 14c (Step S108), and ends the history table registration processing.

Next, the correction candidate presentation processing of the FCMDB 10 will be described with reference to FIG. 15. As illustrated in FIG. 15, if the registration of a new CI by the user is received (Step S201), the FCMDB 10 acquires the In/Out numbers of the relationship of the registered new CI, src, and the CI type (Step S202). The FCMDB 10 determines whether or not there is a history in which attribute values of the new CI coincides with attribute values before correction within the correction history table 14c (Step S203) and, when there is no history with a coincident attribute value within the correction history table 14c (No in Step S203), ends the correction candidate presentation processing.

When there is a history with a coincident attribute value within the correction history table 14c (Yes in Step S203), the FCMDB 10 calculates the priority of the history (Step S204). Specifically, the FCMDB 10 compares whether the In/Out numbers, src, and the CI type of the history, in which the attribute value coincides with the attribute value of the new CI, are respectively the same as the In/Out numbers, src, and the CI type of the new CI, and calculates the priority of the history (Step S204). The FCMDB 10 sorts correction candidates in a descending order of priority and presents the correction candidates to the user (Step S205).

Thereafter, the FCMDB 10 determines whether or not the user carries out correction in accordance with the correction candidate (Step S206) and, when the user carries out correction in accordance with the correction candidate (Yes in Step S206), raises the priority of the relevant history (Step S207). When the user does not carry out correction in accordance with the correction candidate (No in Step S206), the FCMDB 10 lowers the priority of the relevant history (Step S208) and ends the correction candidate presentation processing.

Effects of Second Embodiment

As described above, the FCMDB 10 stores information of the CIs as the management target and relationship representing the relationship between the CIs as the management target. The FCMDB 10 stores the correction information of attribute values included in the information of the CIs, information of CIs with a corrected attribute value, and the relationship between the CIs with a corrected attribute value in the correction history table 14c as correction history information. With this configuration, when a CI is newly added, if attribute value information included in the added configuration item coincides with the correction information stored in the correction history table 14c, the information of CI and the relationship of the correction information is compared with the information of CI and the relationship of the added CI, and the priority of the correction information is calculated. The FCMDB 10 outputs the correction information stored in the correction history table 14c as a correction candidate in accordance with the calculated priority.

For this reason, when the attribute value of the newly added configuration item coincides with the attribute value in the correction history, the FCMDB 10 outputs the past correction history as a correction candidate, detecting an orthographic variant, such as abbreviation of characters or erroneous omission. The FCMDB 10 narrows down correction candidates from the past correction history, calculates the priority by using the configuration item information and the relationship information, and outputs a correction candidate to the user in accordance with the priority, appropriately presenting a correction candidate.

According to the second embodiment, the correction history table 14c of the FCMDB 10 stores the CI type as the information of a CI with a corrected attribute value and stores the In number representing the number of connections with another CIs as the connection source, the Out number representing the number of connections with another CIs as the connection destination, and Src, which is the CI of the connection source, as the relationship of a CI with a corrected attribute value. For this reason, the FCMDB 10 can appropriately present a correction candidate by using the information of the CI and relationship.

According to the second embodiment, it is characterized in that, when the calculated priority is equal to or greater than a predetermined threshold value, the FCMDB 10 outputs the correction information stored in the correction history table 14c as a correction candidate. For this reason, the FCMDB 10 can appropriately narrow down correction candidates to be presented.

According to the second embodiment, when correction is done in accordance with the output correction candidate, the FCMDB 10 changes the priority of the correction candidate higher. For this reason, the FCMDB 10 preferentially presents the correction candidate subsequent time, presenting a correction candidate to the user.

[c] Third Embodiment

Although the embodiments of the invention have been described, the invention may be carried out in various ways, in addition to the above-described embodiments. Hereinafter, another embodiment of the invention will be described as a third embodiment.

(1) Number of Target Databases

Although in the first and second embodiments described above, an example has been described where a correction candidate is presented for an orthographic variant between CIs of two databases, the invention is not limited thereto. For example, it is possible to present a correction candidate for an orthographic variant between configuration items of three or more databases by the same method as in the above-described embodiments.

(2) System Configuration and the Like

Each constituent element of each device illustrated in the drawings is functional and conceptual and does not need to be physically constituted as illustrated in the drawings. That is, the specific form of distribution or integration of each device is not limited to one illustrated in the drawings, and all or a portion of the form may be constituted to be physically distributed or integrated in arbitrary units depending on various loads or usage. For example, the relationship information DB 14a and the attribute information DB 14b may be integrated.

The processing procedure, control procedure, and specific name, various parameters, and information including the parameters in the specification and the drawings may be arbitrarily changed unless particularly described. For example, the value of the default priority or the value of the priority when the In/Out numbers, src, and the CI type are coincident may be arbitrarily changed.

(3) Program

Figure 16:
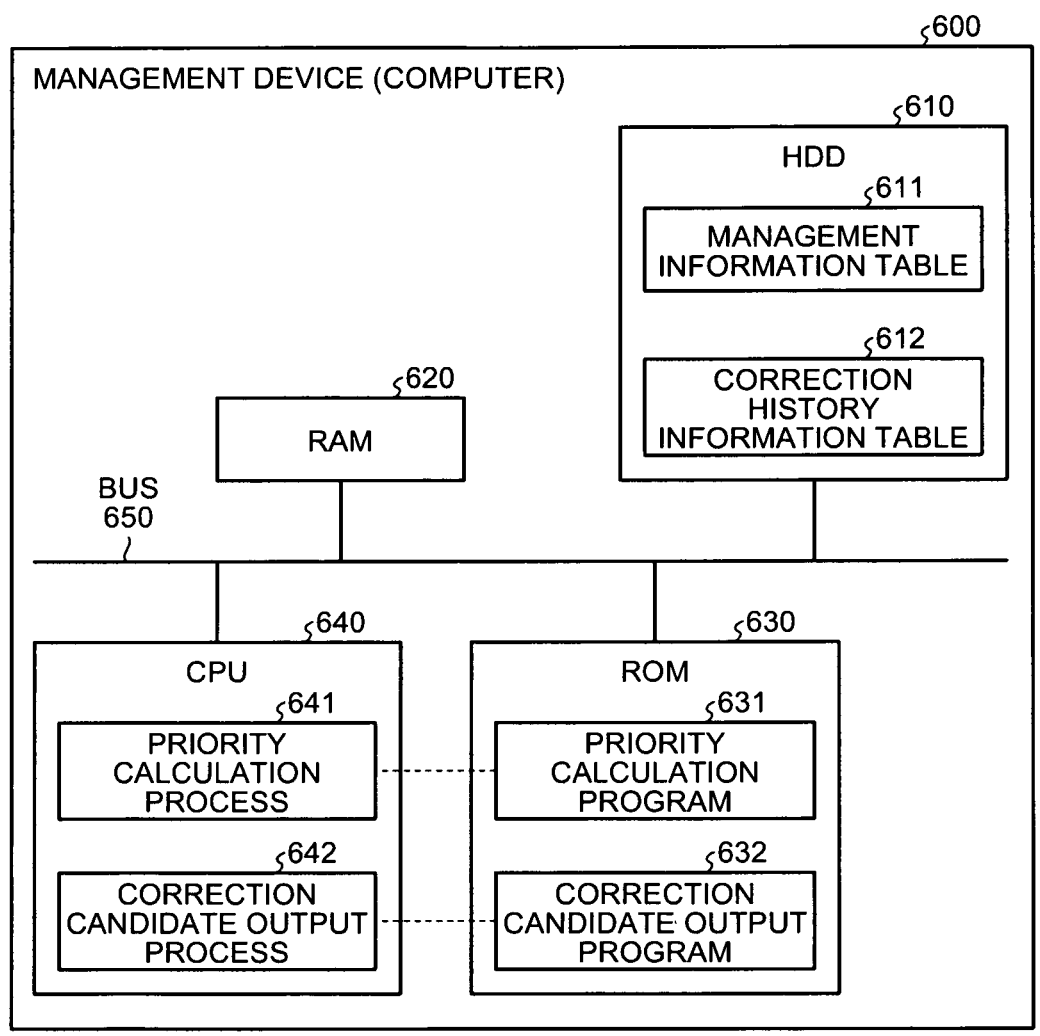
FIG. 16 is a diagram illustrating a computer system 100 which executes a correction candidate output program.
Figure 17:
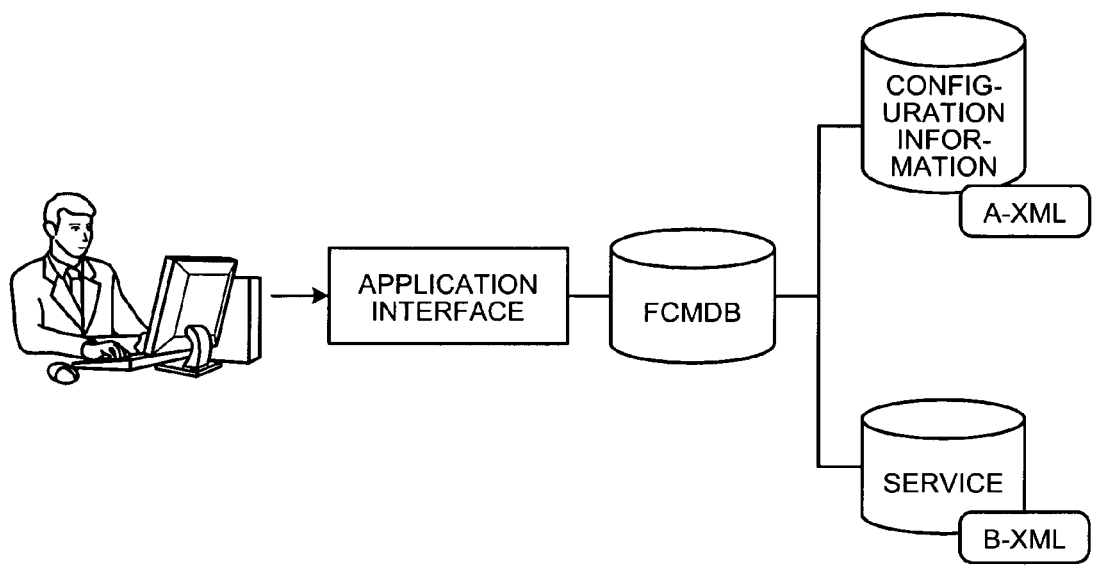
FIG. 17 is a diagram illustrating examples of XML data which is stored in databases which are virtually integrated.
Figure 18:
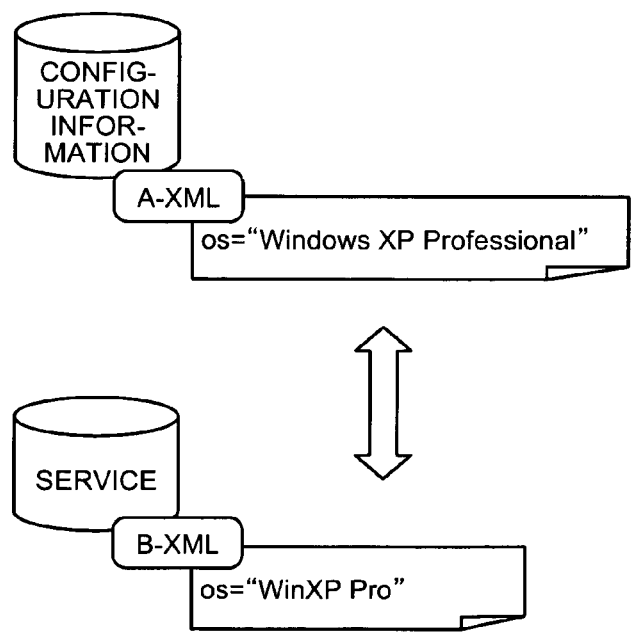
FIG. 18 is a diagram illustrating an example of an orthographic variant.

Various kinds of processing described in the above-described embodiments may be realized by executing a program prepared in advance on a computer. Hereinafter, an example of a computer which executes a program having the same function as in the above-described embodiments will be described with reference to FIG. 16. FIG. 16 is a diagram illustrating a computer which executes a correction candidate output program.

As illustrated in FIG. 16, a computer 600 which serves as a correction candidate output device is configured such that an HDD 610, a RAM 620, a ROM 630, and a CPU 640 are connected to each other through a bus 650.

The ROM 630 stores a correction candidate output program which exhibits the same function as in the above-described embodiments, that is, stores a priority calculation program 631 and a correction candidate output program 632 in advance, as illustrated in FIG. 16.

The CPU 640 reads and executes the programs 631 and 632, such that, as illustrated in FIG. 16, the programs 631 and 632 respectively function as a priority calculation process 641 and a correction candidate output process 642.

As illustrated in FIG. 16, the HDD 610 is provided with a management information table 611 and a correction history information table 612. The CPU 640 registers data in the management information table 611 and the correction history information table 612, reads data from the management information table 611 and the correction history information table 612 and stores data in the RAM 620, and performs processing on the basis of data stored in the RAM 620.

It is possible to present appropriate correction candidates and to appropriately correct an orthographic variant.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management device comprising:
    a processor;
    a storage unit that stores therein for a configuration item whose attribute value is corrected a before-correction attribute value and, in association therewith, an after-correction attribute value and type information of the configuration item or relationship information between the configuration item and another configuration item, the after-correction attribute value being a candidate for one that replaces an attribute value of a configuration item when the attribute value is same as the before-correction attribute value;
    a determination unit using the processor that, when, for a new configuration item, an attribute value and type information or relationship information between the new configuration item and another configuration item are input, and the input attribute value coincides with a before-correction attribute value stored in the storage unit, determines a degree of coincidence between the type information for the new configuration item and type information stored, associated with the before-correction attribute, in the storage unit or between the relationship information for the new configuration item and relationship information stored, associated with the before-correction attribute, in the storage unit, the degree of coincidence including the number of coincidences; and
    an output unit that outputs an after-correction attribute value stored, associated with the before-correction attribute, in the storage unit based on the determination result of the determination unit,
    wherein the before-correction attribute value is an orthographic variant of the after-correction attribute value.

2. The management device according to claim 1, wherein the storage unit stores the number of connections with another configuration item and configuration item information of a connection source as the relationship information between the configuration item and another configuration item.

3. The management device according to claim 1, further comprising:
    a priority calculation unit that calculates a priority based on the degree of coincidence determined by the determination unit, wherein
    when the priority calculated by the priority calculation unit is equal to or greater than a predetermined threshold value, the output unit outputs the after-correction attribute value stored in the storage unit.

4. The management device according to claim 3, wherein, when correction is done in accordance with the after-correction attribute value output from the output unit, the priority calculation unit changes the priority of the after-correction attribute value to be higher.

5. A method of outputting correction candidate, the method comprising:
    determining, when, for a new configuration item, an attribute value and type information or relationship information between the new configuration item and another configuration item are input, and the input attribute value coincides with a before-correction attribute value, wherein the before-correction attribute value and, in association therewith, an after-correction attribute value are stored, for a configuration item whose attribute value is corrected, in a storage unit where type information of the configuration item or relationship information between the configuration item and another configuration item are also stored in association with the before-correction attribute value, and the after-correction attribute value is a candidate for one that replaces an attribute value of a configuration item when the attribute value is same as the before-correction attribute value, a degree of coincidence between the type information for the new configuration item and type information stored, associated with the before-correction attribute, in the storage unit or between the relationship information for the new configuration item and relationship information stored, associated with the before-correction attribute, in the storage unit, the degree of coincidence including the number of coincidences; and
    outputting an after-correction attribute value stored, associated with the before-correction attribute, in the storage unit based on the determination result at the determining,
    wherein the before-correction attribute value is an orthographic variant of the after-correction attribute value.

6. A non-transitory computer-readable recording medium that stores therein a computer program for outputting correction candidate, wherein the computer program causes a computer to execute a process comprising:
    determining, when, for a new configuration item, an attribute value and type information or relationship information between the new configuration item and another configuration item are input, and the input attribute value coincides with a before-correction attribute value, wherein the before-correction attribute value and, in association therewith, an after-correction attribute value are stored, for a configuration item whose attribute value is corrected, in a storage unit where type information of the configuration item or relationship information between the configuration item and another configuration item are also stored in association with the before-correction attribute value, and the after-correction attribute value is a candidate for one that replaces an attribute value of a configuration item when the attribute value is same as the before-correction attribute value, a degree of coincidence between the type information for the new configuration item and type information stored, associated with the before-correction attribute, in the storage unit or between the relationship information for the new configuration item and relationship information stored, associated with the before-correction attribute, in the storage unit, the degree of coincidence including the number of coincidences; and
    outputting an after-correction attribute value stored, associated with the before-correction attribute, in the storage unit based on the determination result at the determining,
    wherein the before-correction attribute value is an orthographic variant of the after-correction attribute value.

7. A management device comprising:
    a processor; and
    a storage unit, wherein the processor executes a process comprising:

determining, when, for a new configuration item, an attribute value and type information or relationship information between the new configuration item and another configuration item are input, and the input attribute value coincides with a before-correction attribute value, wherein the before-correction attribute value and, in association therewith, an after-correction attribute value are stored, for a configuration item whose attribute value is corrected, in a storage unit where type information of the configuration item or relationship information between the configuration item and another configuration item are also stored in association with the before-correction attribute value, and the after-correction attribute value is a candidate for one that replaces an attribute value of a configuration item when the attribute value is same as the before-correction attribute value, a degree of coincidence between the type information for the new configuration item and type information stored, associated with the before-correction attribute, in the storage unit or between the relationship information for the new configuration item and relationship information stored, associated with the before-correction attribute, in the storage unit, the degree of coincidence including the number of coincidences; and outputting an after-correction attribute value stored, associated with the before-correction attribute, in the storage unit based on the determination result at the determining, wherein the before-correction attribute value is an orthographic variant of the after-correction attribute value.

\* \* \* \* \*